US009105113B1

(12) United States Patent
Crow et al.

(10) Patent No.: US 9,105,113 B1
(45) Date of Patent: Aug. 11, 2015

(54) METHOD AND SYSTEM FOR EFFICIENTLY RENDERING CIRCLES

(75) Inventors: Franklin C. Crow, Portola Valley, CA (US); Blaise A. Vignon, Stanford, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 708 days.

(21) Appl. No.: 11/013,977

(22) Filed: Dec. 15, 2004

(51) Int. Cl.
*G06T 15/00* (2011.01)
*G09G 5/00* (2006.01)
*G06T 1/00* (2006.01)
*G06T 19/00* (2011.01)

(52) U.S. Cl.
CPC .............. *G06T 19/00* (2013.01); *G06T 15/00* (2013.01)

(58) Field of Classification Search
CPC ......... G06T 19/00; G06T 15/06; G06T 15/00; G06T 15/04; G06T 11/00; G06T 2200/28; G06T 15/205; G06T 11/20; G06T 1/20
USPC ......... 345/441, 442, 419, 619, 506, 522, 501, 345/611, 582, 613
See application file for complete search history.

(56) References Cited

U.S. PATENT DOCUMENTS

| | | | | |
|---|---|---|---|---|
| 5,438,656 A * | 8/1995 | Valdes et al. | ................... | 345/443 |
| 5,801,710 A * | 9/1998 | Cok et al. | ....................... | 345/440 |
| 6,091,425 A * | 7/2000 | Law | .............................. | 345/619 |
| 6,280,887 B1 * | 8/2001 | Lu | ....................................... | 430/5 |
| 2001/0013873 A1 * | 8/2001 | Wong et al. | .................... | 345/629 |
| 2003/0011610 A1 * | 1/2003 | Kitsutaka | ....................... | 345/582 |
| 2003/0020712 A1 * | 1/2003 | Wada | .............................. | 345/420 |
| 2004/0012563 A1 * | 1/2004 | Papakipos et al. | ............. | 345/157 |
| 2004/0080506 A1 * | 4/2004 | Mech | .............................. | 345/418 |
| 2004/0091150 A1 * | 5/2004 | Kuwahara et al. | ............. | 382/167 |
| 2004/0169650 A1 * | 9/2004 | Bastos et al. | ................... | 345/426 |

OTHER PUBLICATIONS

Cooksey, "Antialiasing and Raytracing", http://astronomy.swin.edu.au/~pbourke/raytracing/aliasing/, Jan. 1994.*
Fleet et al., "Basic Ray Tracing", 2005.*
Genetti et al., "Ray Tracing With Adaptive Supersampling in Object Space", 1993.*
Haeck, "Tip #2: How to draw anti-aliased circles and disks", http://www.simdesign.nl/tips/tip002.html, Oct. 21, 2003.*
Rademacher, "Ray Tracing: Graphics for the Masses", http://www.cs.unc.edu/~radenmach/xroads-RT/RTarticle.html, Aug. 5, 1997.*
Cowart, Robert. "Mastering Windows(TM) 3.1: Special Edition". Sybex. 1992. pp. 376, 377.*
Math.com, "Area of polygons and circles", Feb. 29, 2000, http://www.math.com/school/subject3/lessons/S3U2L4DP.html.*

* cited by examiner

*Primary Examiner* — Jeffrey Chow

(57) ABSTRACT

A graphics processor method and system for rendering a circle. The method includes the step of accessing an instruction to render a circle. A square is defined using at least one graphics primitive, and a circle is defined within the square, wherein a center of the circle corresponds to a center of the square and wherein a radius of the circle is defined by a width of the square. The circle is rasterized into at least one pixel and a coverage value is determined for each pixel of the circle by comparing a distance from the pixel to the center of the circle with the radius of the circle. Each pixel is then shaded in accordance with the coverage value.

22 Claims, 5 Drawing Sheets

METHOD AND SYSTEM FOR EFFICIENTLY RENDERING CIRCLES

CROSS REFERENCE TO RELATED APPLICATION

This application is related to the commonly assigned U.S. Pat. No. 7,081,902 entitled APPARATUS, SYSTEM, AND METHOD FOR GAMMA CORRECTION OF SMOOTHED PRIMITIVES, by Crow et al., filed on Sep. 24, 2003, which is incorporated herein in its entirety.

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers and home video game computers. In such graphic systems, a number of procedures are executed to "render" or draw graphic primitives to the screen of the system. A "graphic primitive" is a basic component of a graphic picture, such as a vertex, polygon, or the like. All graphic pictures are formed with combinations of these graphic primitives. Many procedures may be utilized to perform graphic primitive rendering.

Specialized graphics processing units (e.g., GPUs, etc.) have been developed to optimize the computations required in executing the graphics rendering procedures. The GPUs are configured for high-speed operation and typically incorporate one or more rendering pipelines. Generally, a typical GPU's rendering pipeline comprises a number of hardware-based functional units that are optimized for high-speed execution of graphics instructions/data, where instructions are fed into the front end of the pipeline and the computed results emerge at the bottom of the pipeline.

Graphics processing is typically performed using graphics application program interfaces (API's) that provide a standard software interface that can be run on multiple platforms, operating systems, and hardware. Examples of graphics API's include the Open Graphics Library (OpenGL®) and D3D™. In general, such open graphics application programs include a predetermined, standardized set of commands that are executed by associated graphics pipeline hardware. For example, in a computer system that supports the OpenGL® standard, the operating system and application software programs can make calls according to that standard without knowing any of the specifics regarding the system hardware. Application writers can use graphics APIs to design the visual aspects of their applications without concern as to how their commands will be implemented.

Graphics APIs are particularly beneficial when they are supported by dedicated graphics hardware. To improve graphics processing performance and overall graphics rendering speed, it is desirable that a large percentage of the graphics processing work is performed by the hardware of a graphics pipeline as opposed to software. For example, for high performance, graphics processing should be executed in hardware, wherein large portions of the processing work is executed on a per clock basis. In comparison, software can take hundreds of clock cycles to perform some graphics processing operations. For example, modern GPUs are designed and configured to rapidly and accurately process graphics commands with little impact on other computer system resources.

Problems exist, however, in those cases where graphics commands of the graphics API do not map efficiently to the functions and capabilities of a given GPU architecture. For example, Open GL includes a high level command that instructs the graphics hardware to render a circle (e.g., draw a filled circle at some location on screen, having some color/texture, etc.) to represent an antialiased point. Conventionally, the GPU's driver (e.g., software routines which interface with the hardware functionality of the GPU) has to perform a number of time consuming tasks in order to draw the specified circle.

In one prior art method for rendering an API requested circle, the specified circle is approximated with geometric primitives (e.g., polygons). This method is problematic due to the fact that polygon approximation adds a considerable amount of geometric primitives (e.g., triangles) to the graphics data stream. This would cause a considerable amount of additional work. In another prior art method, as opposed using a plurality of polygons to model a circle, a square (e.g., quadrilateral, two triangles, etc.) is defined and a texture is mapped onto the square. The texture is the image of a circle. For example, the texture mapped area within the circle is opaque and the area outside the circle is transparent. This solution is problematic due to the fact that pixels within the area that is outside the circle (e.g., in the corners of the square) must still be rasterized and shaded. This causes a significant amount of wasted work and overhead. Additionally, this solution consumes a certain amount of texture memory to store the picture of the circle. With both methods, the resulting circle should be anti-aliased in order to preserve the quality of the rendered image.

Another problem with both of the above conventional methods is the fact that the interpreting of the API request for the circle and the translation of this request into the graphics commands for the GPU causes an excessive amount of software branching. The excessive amount of software interpretation and branching tends to bog down the GPU pipeline until the constituent software can be executed. For example, for a typical application, a large number of graphics instructions execute rapidly (e.g., on a per clock basis), hence a graphics data stream can be efficiently processed by the GPU, with the GPU moving through the graphics data stream on a per clock basis until the OpenGL circle request is encountered, whereupon an exception is caused, and the software for handling the specified circle is invoked. There are a large number of conditions and parameters the software must set up. The setup process consumes multiple cycles, and imposes an excessive amount of software execution overhead on the driver. The exception can thus bog down the GPU pipeline for hundreds of clock cycles or more. Thus, what is needed is a more efficient way to render circles requested by a graphics API.

SUMMARY OF THE INVENTION

Embodiments of the present invention provide a method and system for efficiently rendering circles request by a graphics API using the hardware of a graphics processor unit (GPU). Embodiments of the present invention provide fast and efficient GPU hardware rendering support for graphics API instructions that specify circles of varying sizes, positions, colors, etc.

In one embodiment, the present invention is implemented as a circle rendering method supported by the hardware of a GPU of a computer system. The method includes the step of accessing an instruction to render a circle. This instruction is typically a graphics API instruction (e.g., OpenGL) received from an application executing on the computer system. In response to the instruction, a square is defined using at least one graphics primitive (e.g., quadrilateral), and a circle is defined within the square. Alternatively, the square can be defined using two triangle polygons. The center of the circle corresponds to the center of the square and the diameter, and thereby the radius, of the circle is defined by the width of the square. The circle is rasterized into pixels and a coverage value is determined for each pixel of the circle by comparing a distance from the pixel to the center of the circle with the radius of the circle. This comparison determines which pixels are within the circle and which pixels are partially covered by the circle. Each pixel is then shaded in accordance with the coverage value.

In one embodiment, the GPU accesses a lookup table by using the difference comparison (e.g., the distance from the pixel to the center of the circle and the radius of the circle). A corresponding coverage value is read from the lookup table, and each pixel is shaded in accordance with the coverage value to render a smooth anti-aliased edge of the circle. In one embodiment, the rendering includes blending a partially covered pixel with a background pixel, with a respective weight of the partially covered pixel and the background pixel assigned in accordance with the coverage value.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Figure 1:
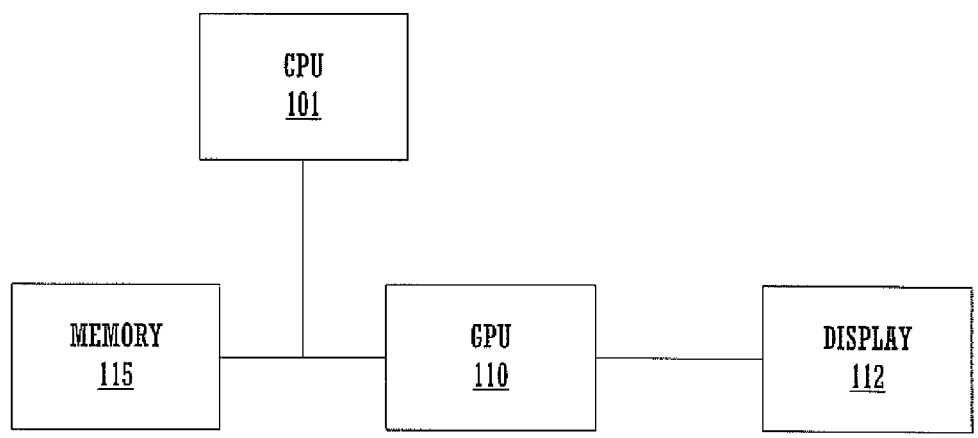
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with one embodiment of the present invention that provides the execution platform for implementing certain hardware-based and software-based functionality of the present invention. As described above, certain processes and steps of the present invention are realized, in one embodiment, as a series of instructions (e.g., software program) that reside within computer readable memory units of a computer system (e.g., system 100) and are executed by the CPU of system 100. When executed, the instructions cause the computer system 100 to implement the functionality of the present invention as described below.

In general, computer system 100 comprises at least one CPU 101 coupled to a system memory 115 and at least one graphics processor unit (GPU) 110 via one or more busses as shown. Access to the system memory 115 is implemented by a memory controller 116. The GPU 110 is coupled to a display 112. System 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, IO devices, and the like.

It should be appreciated that although the GPU 110 is depicted in FIG. 1 as a discrete component, the GPU 110 can be implemented as a discrete graphics card designed to couple to the computer system via a graphics port (e.g., AGP port, PCI Express port, or the like), as a discrete integrated circuit die (e.g., mounted directly on the motherboard), or as an integrated GPU included within the integrated circuit die of a computer system chipset component (e.g., integrated within a Northbridge chip). Additionally, a local graphics memory can be included for the GPU 110 (e.g., for high bandwidth graphics data storage). It should be noted that although the memory controller 116 is depicted as a discrete component, the memory controller 116 can be implemented as an integrated memory controller within a different component (e.g., within the CPU 101, GPU 110, etc.) of the computer system 100. Similarly, system 100 can be implemented as a set-top video game console device such as, for example, the Xbox®, available from Microsoft Corporation of Redmond, Wash.

Embodiments of the Invention

Figure 2:
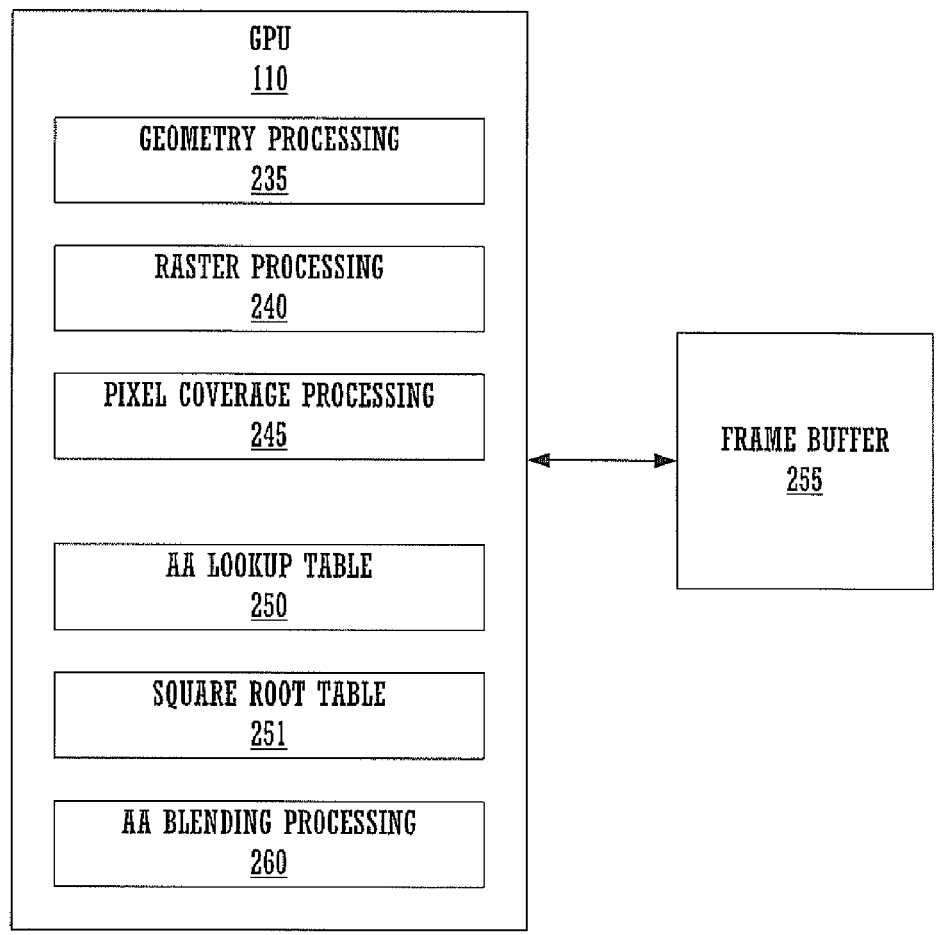
FIG. 2 shows a block diagram depicting internal components of a GPU in accordance with one embodiment of the present invention.

FIG. 2 shows a block diagram depicting internal components of the GPU 110 in accordance with one embodiment of the present invention. As shown in FIG. 2, the GPU 110 includes a graphics pipeline for geometry processing (e.g., transform and lighting), pixel processing (e.g., pixel shading and texture mapping) and raster operations. Some conventional components of GPU 110 are omitted for clarity.

GPU 110 includes a geometry processor 235 to generate primitives and a rasterizer 240 to rasterize primitives, e.g., to convert points, lines, and polygons to fragments, each fragment corresponding to a single pixel of a frame buffer (e.g., frame buffer 255). It should be noted that the frame buffer 255 can be implemented in a local graphics memory, in system memory (e.g., system memory 115), or the like. A pixel coverage processor 245 determines the coverage value of fragments of the primitive with respect to a pixel grid. Pixel coverage processor 245 may, for example, use a sampling technique to sample points within each pixel, determine a coverage value based on the angle of the primitive with respect to the pixel grid, or other algorithms known in the art to calculate a coverage value by estimating the overlap of a fragment with an individual pixel.

An anti-aliasing (AA) lookup table 250 is used to obtain blending weights for a smooth blending processing. For example, in one embodiment, the lookup table 250 is indexed using the coverage value determined by the pixel coverage processor 245 and the corresponding blending weight is retrieved. Lookup table 250 may be stored as a single table or as sub-tables for each color. In one embodiment, lookup table 250 is stored in a memory of GPU 110 to permit the graphics hardware of GPU 110 to facilitate high-bandwidth, low latency access.

A square root lookup table 251 is used to determine square roots of terms used in computing dimensions of graphics primitives. For example, the square root table 251 can be used to compute Euclidean distances between points of interest in a 3D scene or between pixels and different graphics primitives.

A blending processor 260 uses the blending weight corresponding to the pixel coverage value (e.g., from pixel coverage processor 245 and lookup table 250) to determine weights used to blend partially-covered pixels with background pixels stored in the frame buffer 255 during an anti-aliasing process. Such a blending process allows the representation of partially covered pixels and permits the apparent position of edges of circles, lines, dots, polygons, and the like, to be controlled to sub-pixel precision.

Referring still to FIG. 2, embodiments of the present invention provide a method and system for efficiently rendering circles requested by a graphics API using the hardware of a GPU, or analogous type of graphics processor. In so doing, embodiments of the present invention provide fast and efficient GPU hardware rendering support for graphics API instructions that specify circles of varying sizes, positions, colors, etc.

In one embodiment, the GPU 110 receives, or otherwise accesses, an instruction to render a circle. This instruction is typically a graphics API instruction (e.g., OpenGL) received from an application executing on the computer system (e.g., computer system 100 of FIG. 1). In response to the instruction, a square is defined using one or more graphics primitives. For example, a single quadrilateral can be used to define the square, or two triangles can be used.

The circle is defined within the parameters of the square. For example, the center of the circle (e.g., in x,y coordinates) corresponds to the center of the square and the diameter of the circle is defined by the width (e.g., in x direction or y direction) of the square. Inherently, one half the diameter of the circle is the circle's radius.

The circle is then rasterized (e.g., by the raster processor 240) into pixels and a coverage value is determined for each pixel of the circle. This coverage value is determined by comparing a distance (e.g., Euclidean distance) from the pixel to the center of the circle with the radius of the circle. This comparison determines which pixels are within the circle and which pixels are partially covered by the circle. Each pixel is then shaded in accordance with the coverage value.

In one embodiment, the GPU accesses the lookup table 250 by using the difference comparison (e.g., the Euclidean distance from the pixel to the center of the circle and the radius of the circle). A blending weight corresponding to a coverage value is read from the lookup table, and each pixel is shaded in accordance with the blending weight to render a smooth anti-aliased edge of the circle. In one embodiment, the rendering includes blending (e.g., using the blending processor 260) a partially covered pixel with a background pixel, with the respective weights of the partially covered pixel and the background pixel assigned in accordance with the coverage value.

In this manner, embodiments of the present invention provide fast and efficient hardware support for rendering circles as requested by graphics API instructions. The rendering performance of the present invention is much greater than prior art methods. This is due in part to the fact that a conventional polygon engine must use either geometry (e.g., triangles, quadrilaterals, etc.) to approximate points and filled circles, or add a transparent texture to a square to give the effect of a filled circle. Such approximation adds a considerable amount of extra geometry, and texturing requires those parts of the square that are not covered by the filled circle be rasterized and shaded. Furthermore, texturing consumes a certain amount of texture memory. In contrast, embodiments of the present invention use the same edge structure that would describe a square to draw filled circles. This edge structure facilitates a neat fit into a graphics pipeline architecture without requiring substantial changes the rest of the pipeline's hardware, imposes minimal additional overhead, and consumes no texture memory.

Figure 3:
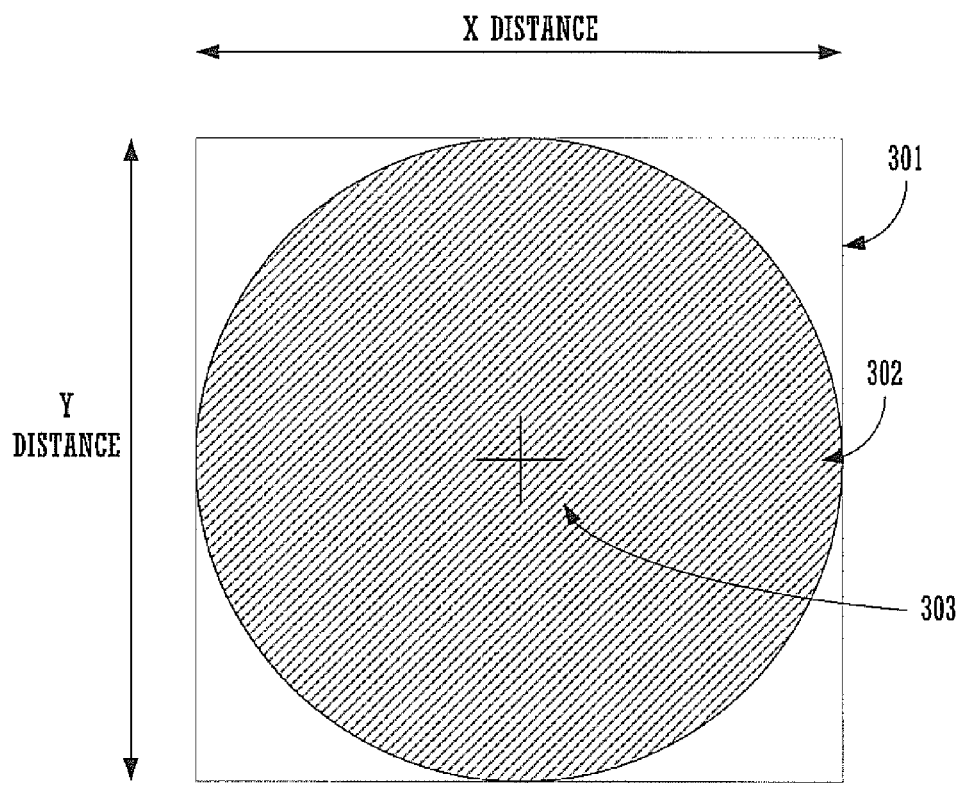
FIG. 3 shows a diagram depicting a square and a circle defined by the square in accordance with one embodiment of the present invention.

FIG. 3 shows a diagram depicting a square 301 and a circle 302 defined by the square 301. The center 303 of the circle 302 and the center of the square 301 are as shown. In one embodiment, the edges formed by the square 301 pass through the graphics pipeline of the GPU 110 to the raster processing stage 240, where it is determined which pixels are covered by the circle. Given a pixel location (e.g., x,y coordinate), the radius and distance to the center of the circle 302 can be computed from the distance to the bounding edges forming the enveloping square 301. From anywhere inside the bounding square 301, the sum of the distance to one side and the distance to the opposite side is the diameter. Half of that sum is the radius.

Similarly, the axis-aligned distance (e.g., x distance or y distance) to the center 303 is given by the difference to opposing edges of the bounding square 301, divided by 2. At the center 303, the distances are equal so their difference is zero. At one of the bounding edges, the difference is equal to the diameter so half is equal to the radius (e.g., the distance to the center 303). The sign of the difference is inconsequential since this value is squared before use.

In one embodiment, the "true distance" (e.g., Euclidean distance) to the center 303 is found by squaring the axis-aligned distances and taking the square root of the sum of the results. In one embodiment, the squares and square root can be determined efficiently by a table lookup (e.g., using square root lookup table 251) since high precision is not necessary in such operations.

Figure 4:
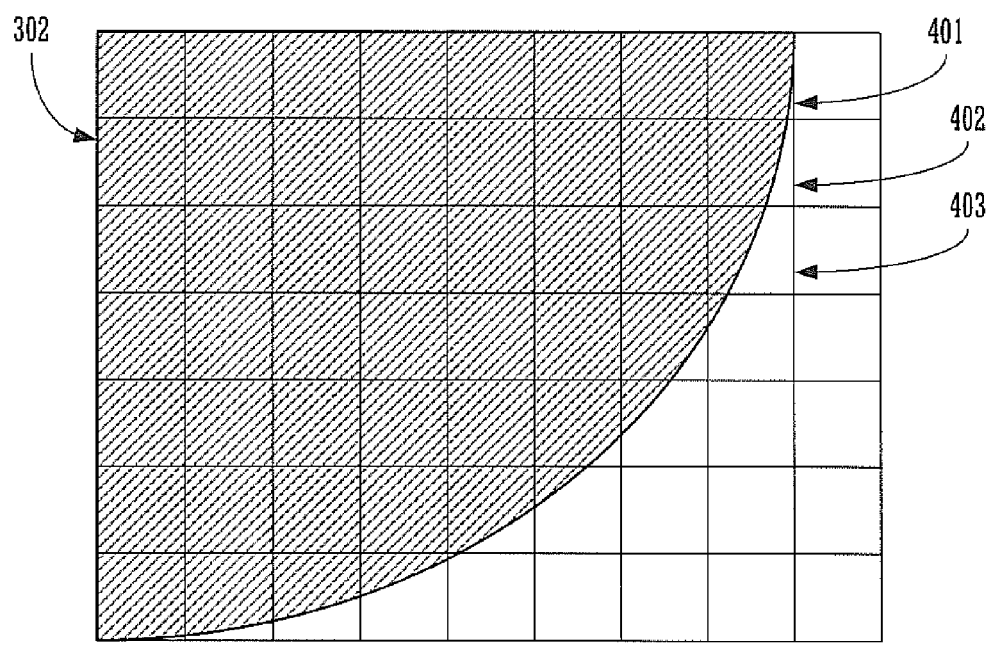
FIG. 4 shows a diagram depicting a portion of a circle as rasterized onto a grid of pixels by a raster processor in accordance with one embodiment of the present invention.

FIG. 4 shows a diagram depicting a portion of the circle 302 as rasterized onto a grid of pixels by the raster processor 240. Once the true distance for a given pixel is found, it may be compared with the radius to determine whether the given pixel is inside or outside the circle 302 and the degree to which a pixel on the edge of the circle 302 is covered.

In one embodiment, sample positions within a pixel may be used to determine what portion of the pixel is inside or outside the circle. In those implementations where GPU hardware exists for computing sample positions within a pixel, the slope and position of an edge of the circle 302 through the pixel may be computed from the x and y distances used to compute the "true distance" to the center 303. This edge may then be used to compute the samples.

In one embodiment, an OpenGL-compatible smooth (e.g., anti-aliased) edge for the circle 302 can be rendered. In this embodiment, a smooth edge which rolls off correctly at the circle boundary can be computed by using a threshold to determine when the pixel is within a "roll-off zone" around the circle's edge. By subtracting the radius at the inside of the roll-off zone from the true distance and using a lookup table (e.g., the lookup table 250) to control the roll-off profile, a smooth circle edge is obtained. In such an implementation, the lookup table 250 comprises a coverage lookup table or an antialiasing lookup table.

For example, in one embodiment, for each pixel covered by the circle 302, the pixel coverage processor 245 indexes the lookup table 250 using the difference between the true distance and the radius for each pixel. A corresponding coverage value is read from the lookup table, and each pixel is shaded in accordance with the coverage value to render a smooth anti-aliased edge of the circle. In this manner, the coverage value read from the lookup table 250 corresponds to a blending weight. Using this blending weight, the color of a partially covered pixel is blended with the color of a background pixel. Thus, in a case where the circle 302 is completely black and the background color is completely white, pixel 401 would be dark gray, pixel 402 would be medium gray, and pixel 403 would be light gray.

Figure 5:
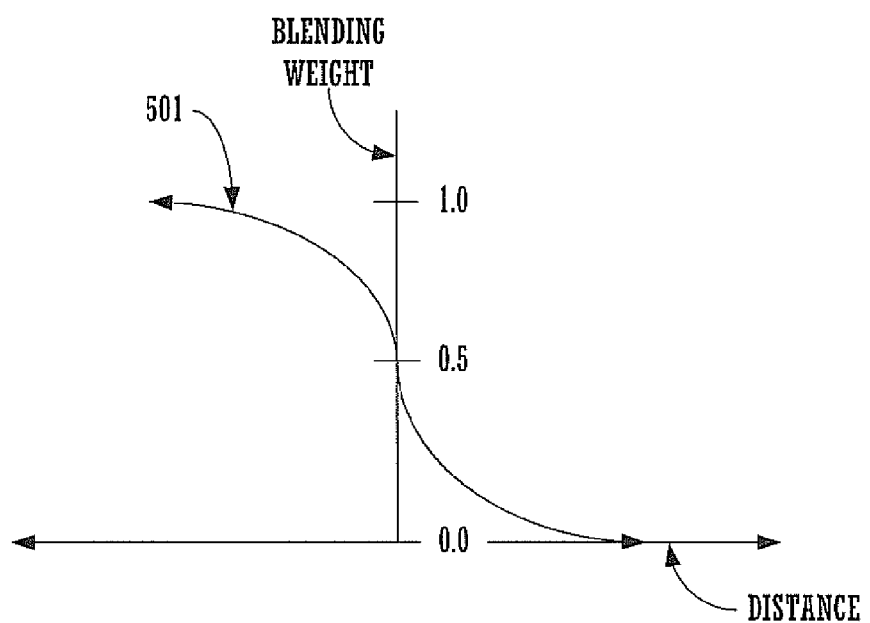
FIG. 5 shows a diagram depicting the roll-off zone as implemented by a lookup table in accordance with one embodiment of the present invention.

FIG. 5 shows a diagram depicting the roll-off zone as implemented by the lookup table 250 in accordance with one embodiment of the present invention. As shown in FIG. 5, the lookup table is indexed with the difference between the computed true distance and the radius. For example, as shown in FIG. 5, those pixels on the left side of the diagram have a blending weight of 1.0 (e.g., completely covered) while those pixels on the right side of the diagram have a blending weight of 0.0 (e.g., completely uncovered). Partially covered pixels have blending weights as indicated by the trace 501 of the roll-off zone.

In one embodiment, to represent circles less than one pixel in diameter, coverage values for a one-pixel circle are computed then scaled by the pixel size. Accordingly, a circle of diameter one-half pixel should have ¼ the coverage of a one-pixel circle. This allows smaller circles to fade out gracefully instead of popping on or off. A linear fade wherein a circle of one-half pixel in diameter has half the coverage of a one-pixel circle is also effective, if not as correct.

In one embodiment, the square root table 251 is extended to a wider range by shifting large values back to within the range of the table and then shifting up the results half as far. This allows the square root table 251 to cover a much wider range by gracefully degrading precision as the numbers increase in magnitude.

In one embodiment, larger circles can be drawn by a method configured to take advantage of the fact that high precision is typically required only near the edge of the circle. For example, in those cases where a large circle is needed, the cost of a square root table (e.g., in memory) and the time taken to access it (e.g., in processor cycles) can be prohibitive. In such cases, an alternative method can be used which avoids use of the square root table.

In one embodiment, the square root table 251 is avoided by taking advantage of a property of the difference of two squares. In such an embodiment, only the squares of the radius and distance to the circle are used in operation, which are easier to calculate. For example, in a case where r and d are the radius and distance to the center of the circle respectively, it should be noted that $r^2-d^2=(r+d)(r-d)$. Thus, $r-d=(r^2-d^2)/(r+d)$. The value of $r-d$ needs to be found in order to determine how close to the edge of the circle a given pixel is. Near the edge of the circle r and d are near equal. Generally, precise comparisons are only needed near the edge of the circle, and this property can be used to approximate r+d with 2*r, which is constant for the entire circle. Now the difference between the true distance and the radius for each pixel is given by $(r^2-d^2)/(2*r)$. This difference is then used to obtain the blending weight for the pixel. The value of $r^2$ needs to be calculated only once for each circle, as does 2*r. A low-precision divide can be used since typically only a few bits of precision are needed to determine a coverage level for each pixel. Additionally, only a low-precision calculation of $d^2$ is needed for each pixel since typically only the first few significant digits matter.

In one embodiment, a low-precision divide is realized by deleting the leading zeroes in the divisor, shifting the quotient down by the same number of bits then using a lookup table to compute the reciprocal of the next few bits of the divisor. A quick short multiply then yields an adequate approximation to the difference of r and d.

In one embodiment, the methods above can be used to draw anti-aliased circles both filled, and as curved lines. For filled circles, all pixels are treated as fully covered where d is less than r. For curved lines, the coverage lookup table 250 is used on the absolute difference so that pixels where d is less than r are treated just as pixels where d is greater than r. The thickness of the line can be adjusted by a threshold or by adjusting the values stored in the coverage lookup table 250.

Additional descriptions of the use of a lookup table to render smooth anti-aliased pixels can be found in commonly assigned U.S. Pat. No. 7,081,902 entitled APPARATUS, SYSTEM, AND METHOD FOR GAMMA CORRECTION OF SMOOTHED PRIMITIVES, by Crow et al., filed on Sep. 24, 2003, which is incorporated herein in its entirety.

In this manner, embodiments of the present invention provided advantages in that their implementation fits within an existing polygon rasterizing pipeline with insubstantial changes to the rest of the pipeline. No information about the circle (e.g., radius, center point, etc.) need be transmitted down the pipeline as this is all recovered from the conventional edge descriptions of the square. The precision of the arithmetic used, and thus the silicon area required for its implementation, can be determined by the size limits on the circles to be drawn in the case of those embodiments using the square root table, or determined by the precision desired for those embodiments using the "difference of squares" and can therefore be quite small.

Additionally, including circle-drawing hardware within the GPU 110 allows a number of functions for conversion of circles to triangles, textured squares, or other intermediate forms to be deleted from the software supporting the hardware functions, making for a simpler complete system when ready for the end user. The software simplification eliminates many of the expensive (e.g., GPU clock cycle intensive) set up instructions required for rendering circles, which reduces the amount of software branching in a graphics data stream. The reduced amount of software interpretation and branching reduces bottlenecks in the GPU pipeline and helps the graphics instructions execute rapidly (e.g., on a per clock basis).

What is claimed is:

1. A graphics processor, comprising:
    means for accessing an instruction to render a circle from a graphics application via a graphics application programming interface in response to a graphics API call;
    in response to the instruction, means for defining a square using at least one graphics primitive;
    means for sending data defining the square to a rasterizer using a graphics pipeline;
    means for using edges of the square to define a circle within the square, wherein a center of the circle corresponds to a center of the square and wherein a radius of the circle is defined by a width of the square;
    means for rasterizing the circle into at least one pixel using a rasterizer;
    means for determining a coverage value for each pixel of the circle by comparing a distance from the pixel to the center of the circle with the radius of the circle;
    means for accessing an anti-aliasing lookup table to obtain a plurality of blending weights; and
    means for shading each pixel in accordance with the coverage value and/or blending weights, wherein the shading is implemented without consuming texture memory, wherein the instruction is a graphics API instruction.

2. The graphics processor of claim 1, further comprising:
    accessing a square root lookup table to determine the distance from the pixel to the center of the circle;
    reading the coverage value from a coverage lookup table; and
    shading each pixel in accordance with the coverage value to render an anti-aliased the edge of the circle.

3. The graphics processor of claim 2, wherein the rendering includes blending a partially covered pixel with a background pixel, with a respective weight of the partially covered pixel and the background pixel assigned in accordance with the coverage value.

4. The graphics processor of claim 2, wherein the coverage lookup table is run time loadable.

5. The graphics processor of claim 1, wherein the comparing the distance from the pixel to the center of the circle with the radius of the circle to determine the coverage value for each pixel of the circle comprises:
    computing a term comprising the difference between the distance squared and the radius squared; and
    dividing the term by twice the radius.

6. The graphics processor of claim 1, further comprising:
    if the circle has a diameter smaller than one pixel, determining the coverage value; and
    scaling the coverage value in accordance with a ratio of the circle size and the pixel size.

7. The graphics processor of claim 1, wherein the square is defined using two triangle polygons.

8. The graphics processor of claim 1, wherein the square is defined using one quadrilateral polygon.

9. A graphics processor, comprising:
    a geometry processor for processing geometric primitives, the geometric primitives received from a graphics application via a graphics application programming interface;
    a graphics pipeline for sending data defining a geometric primitive to a rasterizer;
    a rasterizer to receive data defining a geometric primitive and automatically render at least one geometric primitive comprising a square as circle in response to a graphics API call, wherein the rasterizer uses edges of the square to define the circle, wherein a center of the circle corresponds to a center of the square and wherein a radius of the circle is defined by a width of the square;
    a coverage processor to calculate a coverage value per pixel of the circle by comparing a distance from the pixel to the center of the circle with the radius of the circle;
    a blending processor to shade each pixel of the circle in accordance with the coverage value, wherein the shading is implemented without consuming texture memory, wherein the blending processor accesses an anti-aliasing lookup table to obtain a plurality of blending weights, and wherein each pixel is shaded in accordance with the coverage value and/or blending weight to render an anti-aliased the edge of the circle.

10. The graphics processor of claim 9, wherein the coverage processor accesses a square root lookup table to determine the distance from the pixel to the center of the circle, reads the coverage value from a coverage lookup table, and wherein each pixel is shaded in accordance with the coverage value to render an anti-aliased the edge of the circle.

11. The graphics processor of claim 10, wherein the square root lookup table is stored in a system memory for a computer system.

12. The graphics processor of claim 10, wherein the square root lookup table is stored in a local graphics memory for the graphics processor.

13. The graphics processor of claim 9, wherein the comparing the distance from the pixel to the center of the circle with the radius of the circle to determine the coverage value for each pixel of the circle comprises:
    computing a term comprising the difference between the distance squared and the radius squared; and
    dividing the term by twice the radius.

14. The graphics processor of claim 9, wherein the blending processor is configured to blend a partially covered pixel with a background pixel, wherein a respective blending weight of the partially covered pixel and the background pixel are assigned in accordance with the coverage value.

15. The graphics processor of claim 9, wherein, if the circle has a diameter smaller than one pixel, the coverage processor is configured to determine the coverage value and scale the coverage value in accordance with a ratio of the circle size and the pixel size.

16. The graphics processor of claim 9, wherein the geometric primitive is a square defined using two triangle polygons.

17. The graphics processor of claim 9, wherein the geometric primitive is a square defined using one quadrilateral polygon.

18. A graphics computer system, comprising:
a central processing unit;
a system memory coupled to the central processing unit; and
a graphics processor coupled to the central processing unit, the graphics processor comprising:
a geometry processor for processing geometric primitives, the geometric primitives received from a graphics application via a graphics application programming interface;
a graphics pipeline for sending data defining a geometric primitive to a rasterizer;
a rasterizer to receive data defining a geometric primitive and automatically render at least one geometric primitive comprising a square as circle in response to a graphics API call, wherein the rasterizer uses edges of the square to define the circle, wherein a center of the circle corresponds to a center of the square and wherein a radius of the circle is defined by a width of the square;
a coverage processor to calculate a coverage value per pixel of the circle by comparing a distance of the pixel from the center of the circle to a radius of the circle; and
a blending processor to shade each pixel of the circle in accordance with a blending weight, wherein the blending processor accesses an anti-aliasing lookup table to obtain the blending weight, wherein the shading is implemented without consuming texture memory, wherein each pixel is shaded in accordance with the coverage value and/or blending weight to render an anti-aliased the edge of the circle.

19. The system of claim 18, wherein the coverage processor accesses a square root lookup table to determine the Euclidean distance from the pixel to the center of the circle, reads the blending weight from an antialiasing lookup table, and shades each pixel in accordance with the blending weight to render an anti-aliased edge of the circle.

20. The system of claim 18, wherein the coverage processor computes a term comprising the difference between the distance squared and the radius squared and divides the term by twice the radius to obtain the blending weight to render an anti-aliased edge of the circle.

21. The system of claim 18, wherein the blending processor is configured to blend a partially covered pixel with a background pixel, wherein a respective blending weight of the partially covered pixel and the background pixel are assigned in accordance with the coverage value.

22. The system of claim 18, wherein the anti-aliasing lookup table is stored as a plurality of some tables for each color.

* * * * *